US010800869B2

(12) United States Patent
Hietaniemi et al.

(10) Patent No.: US 10,800,869 B2
(45) Date of Patent: Oct. 13, 2020

(54) POLYMER COMPOSITION AND ITS USES

(71) Applicant: Kemira Oyj, Helsinki (FI)

(72) Inventors: Matti Hietaniemi, Espoo (FI); Rosa Carceller, Espoo (FI); Asko Karppi, Turku (FI); Joonas Likander, Espoo (FI)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 16/462,560

(22) PCT Filed: Dec. 15, 2017

(86) PCT No.: PCT/FI2017/050897
§ 371 (c)(1),
(2) Date: May 21, 2019

(87) PCT Pub. No.: WO2018/109279
PCT Pub. Date: Jun. 21, 2018

(65) Prior Publication Data
US 2019/0276578 A1     Sep. 12, 2019

(30) Foreign Application Priority Data
Dec. 16, 2016  (FI) .................................... 20165979

(51) Int. Cl.
| | | |
|---|---|---|
| *C08F 265/10* | (2006.01) | |
| *C08F 220/56* | (2006.01) | |
| *D21H 17/37* | (2006.01) | |
| *D21H 17/45* | (2006.01) | |
| *D21H 21/10* | (2006.01) | |
| *D21H 17/44* | (2006.01) | |
| *D21H 17/41* | (2006.01) | |

(52) U.S. Cl.
CPC .......... *C08F 265/10* (2013.01); *C08F 220/56* (2013.01); *D21H 17/37* (2013.01); *D21H 17/375* (2013.01); *D21H 17/41* (2013.01); *D21H 17/44* (2013.01); *D21H 17/45* (2013.01); *D21H 17/455* (2013.01); *D21H 21/10* (2013.01); *C08F 2500/17* (2013.01); *C08F 2500/24* (2013.01)

(58) Field of Classification Search
CPC .. D21H 17/455; D21H 17/375; C08F 220/56; C08F 265/10
See application file for complete search history.

(56) References Cited

U.S. PATENT DOCUMENTS

| | | | |
|---|---|---|---|
| 6,608,124 B1 | 8/2003 | Huang et al. | |
| 2006/0130991 A1* | 6/2006 | Solhage | D21H 17/375 162/158 |
| 2007/0032677 A1 | 2/2007 | Herth et al. | |
| 2012/0101194 A1* | 4/2012 | Broecher | C08F 265/04 524/35 |

FOREIGN PATENT DOCUMENTS

| | | |
|---|---|---|
| EP | 0764140 B1 | 10/1998 |
| WO | 2012175528 A1 | 12/2012 |
| WO | 2016030407 A1 | 3/2016 |

OTHER PUBLICATIONS

Finnish Patent and Registration Office, search report of Finnish patent application No. 20165969, dated Jun. 8, 2017, 2 pages.

* cited by examiner

*Primary Examiner* — Mark S Kaucher
(74) *Attorney, Agent, or Firm* — Berggren LLP

(57) ABSTRACT

A polymer composition includes a first host polymer, which is a copolymer of (meth)acrylamide and at least one cationic first monomer, and a second polymer, which is a copolymer of (meth)acrylamide and at least one cationic second monomer. The second polymer is polymerised in presence of the first host polymer, and the first host polymer has a higher cationicity than the second polymer, the difference in cationicity of the first host polymer and the second polymer being at least 3 mol-%, at least 5 mol-%, more preferably at least 7 mol-%. The polymer composition has a standard viscosity of >2.0 mPas, measured at 0.1 weight-% solids content in an aqueous NaCl solution (1 M), at 25° C., using Brookfield VII T viscometer with UL adapter. The invention relates also to uses of said polymer composition.

18 Claims, No Drawings

POLYMER COMPOSITION AND ITS USES

PRIORITY

This application is a U.S. national application of the international application number PCT/FI2017/050897 filed on Dec. 15, 2017 and claiming priority of Finnish application 20165979 filed on Dec. 16, 2016 the contents of all of which are incorporated herein by reference.

The present invention relates to a polymer composition and its uses according to preambles of the enclosed independent claims.

Polymers, such as polyacrylamide, are used in paper and board making for improving the drainage during web formation. The challenge in drainage is to combine good initial flocculation with dense floc structure. Problems in flocculation lead to reduced web quality and problems in floc structure reduce water drainage in press dewatering, which increases the drying demand in the succeeding drying steps, which thus may become the limiting part for the paper machine productivity.

Polymers are also used in sludge dewatering, for example, in municipal water treatment as well as in paper and board making processes. Polymers, such as polyacrylamide, are used, for example, for dewatering of deinking sludge in papermaking processes that use recycled fibres. Deinking sludge comprises i.a. ink, polymeric materials, inorganic fillers and fibre material. Effective dewatering of this sludge is needed for its further use, for example, as a fuel in incinerators, or as an additive in the manufacture of cement-based products, wood containing panels, composite materials, or its carbonisation into char. Paper and board making processes comprise also other sludges, which contain fibre material and which are demanding to dewater efficiently.

Nowadays the water circulation of a paper or board machine is more and more closed and the amount of used fresh water is minimised. This may lead to enrichment of chemical substances in circulation water, and e.g. increase in the conductivity of the water that is used for fibre stock making. Use of recycled fibres as raw material is also increasing, which may lead to increase in dissolved and colloidal substances, so called anionic trash, in the fibre stock. It has been observed that the performance efficiency of the conventional drainage systems, which employ linear cationic or anionic polyacrylamides with high molecular weight, decreases when they are used in conjunction with fibre stock having high conductivity and/or increased amounts of anionic trash. The loss of polymer performance leads to decrease in drainage, fibre and fines retention, as well as decrease in press dewatering. A simple increase in polymer, such as polyacrylamide, dosage is not an optimal solution, even if fibre stocks with high conductivity and/or high concentration of dissolved and colloidal substances might require it. Increased addition of high molecular weight polyacrylamide may eventually lead over-flocculation of the fibre stock, which further reduces press dewatering rate and causes poor formation, thus reducing both productivity of the process and strength of the produced paper.

Low molecular weight polymers with high charge density have been used to improve dewatering and pressing efficiency in manufacture of certain paper grades, either alone or with systems involving the use of cationic high molecular weight polyacrylamide. However, these low molecular weight polymers are limited in their ability to provide necessary retention without increased polymer dosage, which may lead into over-cationisation of the paper or board making process, and as a result increased foaming and other related problems. Two-component systems comprising both low molecular weight polymer with high charge density and cationic high molecular weight polyacrylamide are known but they are difficult to control and add complexity to the paper or board making process. Furthermore, it has been observed that the two-component systems may still be unable to provide the desired paper properties and productivity in the challenging conditions with high conductivity, poor fibre quality and increased substance load, for example ash, starch, size or dissolved and colloidal substances.

There is a need for new effective compositions that can be used for drainage in paper or board making. It would be advantageous if the compositions could be used also in sludge dewatering.

An object of this invention is to minimise or even eliminate the disadvantages existing in the prior art.

An object is also to provide a polymer composition which provides an effective drainage in paper or board making.

A further object of this invention is to provide a polymer composition which is also suitable for fibre stocks having a high conductivity and/or high amount of dissolved and colloidal substances.

A yet further object of this invention is to provide a polymer composition which is suitable for sludge dewatering, especially deinking sludge dewatering.

These objects are attained with the invention having the characteristics presented below in the characterising parts of the independent claims. Some preferable embodiments are disclosed in the dependent claims.

The features recited in the dependent claims and the embodiments in the description are mutually freely combinable unless otherwise explicitly stated.

The exemplary embodiments presented in this text and their advantages relate by applicable parts to all aspects of the invention, even though this is not always separately mentioned.

Typical polymer composition according to the present invention comprises
- a first host polymer, which is a copolymer of (meth)acrylamide and at least one cationic first monomer,
- a second polymer, which is a copolymer of (meth)acrylamide and at least one cationic second monomer, the second polymer being polymerised in presence of the first host polymer, wherein the first host polymer has a higher cationicity than the second polymer, the difference in cationicity of the first host polymer and the second polymer being at least 3 mol-%, preferably at least 5 mol-%, more preferably at least 7 mol-%, and wherein the polymer composition has a standard viscosity of >2.0 mPas, measured at 0.1 weight-% solids content in an aqueous NaCl solution (1 M), at 25° C., using Brookfield DVII T viscometer with UL adapter.

Typical use of polymer composition according to the invention is for dewatering of sludge.

Another typical use of polymer composition according to the invention is as draining agent in paper or board manufacture.

Typical method according to the present invention for making paper or board comprises
  obtaining a fibre stock,
  adding a drainage agent to the fibre stock,
  forming the fibre stock into a fibre web,
wherein the drainage agent comprises a polymer component according to the invention.

Now it has been surprisingly found out that clear improvements in drainage and dewatering are obtained with a polymer composition, which is obtained by polymerising a second polymer in the presence of a first host polymer. The first polymer thus acts as a host polymer and as a polymerisation medium for the second polymer. Both first and second polymer are copolymers of (meth)acrylamide and their properties provide an unexpected effect which improves floc formation and stability when the polymer composition is used as a drainage agent or retention agent in paper or board making or as an additive in dewatering of sludge.

The polymer composition comprises a first host polymer which is a copolymer of (meth)acrylamide, preferably acrylamide, and at least one cationic first monomer, and a second polymer which is a copolymer of (meth)acrylamide, preferably acrylamide, and at least one cationic second monomer. The first and/or second monomer may be selected from 2-(dimethylamino)ethyl acrylate (ADAM), [2-(acryloyloxy)ethyl] trimethylammonium chloride (ADAM-Cl), 2-(dimethylamino)ethyl acrylate benzylchloride, 2-(dimethylamino)ethyl acrylate dimethylsulphate, 2-di methylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino)propyl] trimethylammonium chloride (APTAC), [3-(methacryloylamino)propyl] trimethylammonium chloride (MAPTAC), and diallyldimethylammonium chloride (DADMAC).

The first host polymer may preferably be prepared by polymerisation of (meth)acrylamide and at least one cationic first monomer, which is selected from diallyldimethyl ammonium chloride (DADMAC), [3-(acrylamide)propyl] trimethylammonium chloride (APTAC), and [3-(methacrylamido)propyl]trimethylammonium chloride (MAPTAC) and any combinations thereof. Even more preferably, the first host polymer may be prepared by polymerisation of acrylamide and diallyldimethylammonium chloride (DADMAC). Cationic monomers DADMAC, APTAC and MAPTAC show hydrolytic stability which improves the overall stability of the obtained polymer composition. Furthermore, the cationic charge of these monomers is not pH dependent, which makes the obtained polymer composition suitable for various applications without limitations imposed by process pH. Use of copolymers as the first host polymer instead of homopolymers may provide advantageous properties for the polymer composition, such as higher solubility and higher molecular weight.

The first host polymer may be prepared by polymerising (meth)acrylamide with one type of cationic first monomer, or the first host polymer may be prepared by polymerising (meth)acrylamide with two or more different cationic first monomers. Preferably the first host polymer is prepared by polymerising (meth)acrylamide with one type of cationic first monomer.

The second polymer may preferably be prepared by polymerisation of (meth)acrylamide and at least one cationic second monomer, which is selected from the group consisting of 2-(dimethylamino)ethyl acrylate (ADAM), [2-(acryloyloxy)ethyl] trimethylammonium chloride (ADAM-Cl), 2-dimethylaminoethyl methacrylate (MADAM), [2-(methacryloyloxy)ethyl] trimethylammonium chloride (MADAM-Cl), [3-(acryloylamino)propyl] trimethylammonium chloride (APTAC), [3-(methacryloylamino)propyl] trimethylammonium chloride (MAPTAC), and diallyldimethylammonium chloride (DADMAC). Preferably the cationic second monomer is selected from [2-(acryloyloxy)ethyl] trimethylammonium chloride (ADAM-Cl), [2-(methacryloyloxy)ethyl] trimethylammonium chloride (MADAM-Cl), [3-(acryloylamino)propyl] trimethylammonium chloride (APTAC) and [3-(methacryloylamino)propyl] trimethylammonium chloride (MAPTAC), more preferably from [2-(acryloyloxy)ethyl] trimethylammonium chloride (ADAM-Cl).

Cationic monomers ADAM-Cl, MADAM-Cl, APTAC and MAPTAC are preferable as cationic second monomers as their charge is not pH dependent, and high molecular weights are obtainable for the second polymer when these cationic monomers are used. This makes the polymer composition suitable for many different applications and provides enhanced performance stability also in situations where the process pH changes during the use of the polymer composition. The high molecular weight of the second polymer may enhance especially the flocculation performance of the polymer composition The second polymer may be prepared by polymerising (meth)acrylamide with one type of cationic second monomer, or the second polymer may be prepared by polymerising (meth)acrylamide with two or more different cationic second monomers. Preferably the second polymer is prepared by polymerising (meth)acrylamide with one type of cationic second monomer.

Preferably the cationic first monomer(s) and the cationic second monomer(s) are different from each other. This means that the first host polymer and the second polymer are copolymers of (meth)acrylamide that are different from each other, i.e. the cationic first monomer(s) used in copolymerisation of the first host polymer and the cationic second monomer(s) used in copolymerisation of the second polymer are different from each other. According to one preferable embodiment the cationic first monomer is diallyldimethylammonium chloride and the cationic second monomer is [2-(acryloyloxy)ethyl] trimethylammonium chloride.

According to one preferable embodiment the cationic first monomer is diallyldimethyl-ammonium chloride (DADMAC) and the cationic second monomer is [2-(acryloyloxy)ethyl] trimethylammonium chloride (ADAM-Cl) or [2-(methacryloyloxy)ethyl] trimethylammonium chloride (MADAM-Cl), especially ADAM-Cl. These combinations give a polymer composition where the both polymers have optimal weight average molecular weight, the weight average molecular weight of the first host polymer being lower than the weight average molecular weight of the second polymer.

In the present context the term cationicity relates to the amount of structural units which originate from cationic monomers in a polymer. In other words, cationicity of a polymer defines, in mol-%, the amount of cationic monomers used for polymerisation of the said polymer, calculated from the total amount of monomers used for the polymerisation of the said polymer. The cationicity of the second polymer indicates the amount of cationic monomers, calculated from the total amount of monomers used for the polymerisation of the second polymer, which are added at the start of the polymerisation to the solution of the first host polymer, which functions as the polymerisation medium.

The first host polymer has a higher cationicity than the second polymer. The difference in cationicity of the first host polymer and the second polymer is at least 3 mol-%, preferably at least 5 mol-%, more preferably at least 7 mol-%. At the same time, the difference in cationicity may preferably be at the most 70 mol-%, more preferably at the most 40 mol-%, even more preferably at the most 30 mol-%. The difference in cationicity may be in the range of 3-70 mol-%, preferably 3-40 mol-% or 3-30 mol-%, more preferably 5-40 mol-% or 5-30 mol-%, sometimes more preferably 7-30 mol-%. It is assumed that when the polymer composition is used as a drainage aid or in sludge treatment, the first host polymer, which has the higher amount of cationic structural units and thus cationic charges, is interacting with dissolved and colloidal substances as well as other detrimental anionic substances. Thus the second polymer with lower cationicity remains free for interactions which result in floc formation. The polymer composition thus provides an optimised fixation of disturbing anionic substances and simultaneous flocculation performance. Without wishing to be bound by any theory it is further assumed that the polymerisation of the second polymer having a lower cationicity in the presence of the first host polymer having a higher cationicity results in especially beneficial charge distribution and/or location of charges in the polymer composition for capturing anionic trash and/or flocculation, compared to e.g. conventional cationic polymers or conventional mixtures of two or more cationic polymers. In the present context the terms "fixation", "fixing" and "fix" means that the disturbing substances, such as hydrophobic and/or anionic substances, are associated or attached onto the fibres and/or to the formed flocs at least temporarily or permanently.

The first host polymer may have cationicity of at most 80 mol-%, preferably at most 60 mol-%, more preferably at most 40 mol-%, even more preferably at most 30 mol-%. According to one embodiment of the invention the first host polymer may have cationicity in the range of 5-80 mol-%, preferably 5-60 mol-%, more preferably 5-40 mol-%, most preferably 10-30 mol-%.

The second polymer may have cationicity of at most 60 mol-%, preferably at most 50 mol-%, more preferably at most 20 mol-%, even more preferably at most 15 mol-%, most preferably at most 10 mol-%. According to one embodiment the cationicity of the second polymer may be in a range of ranges 1-60 mol-%, preferably 1-50 mol-%, more preferably 1-20 mol-%, even more preferably 1-15 mol-%, most preferably 5-10 mol-%. It has been observed that the lower cationicity values for the second polymer give good results when the polymer composition is used for dewatering of deinking sludge or as a drainage agent in paper or board manufacture, and may be especially beneficial for manufacturing paper grades, where the final paper product is intended for food contact.

The weight average molecular weight of the first host polymer may be up to 3 000 000 g/mol. However, according to a preferable embodiment of the present invention the first host polymer has a weight average molecular weight <1 000 000 g/mol. The weight average molecular weight of the first host polymer may preferably be <200 000 g/mol, more preferably <100 000 g/mol, even more preferably <50 000 g/mol, sometimes even <47 000 g/mol. According to one embodiment of the invention the weight average molecular weight of the first host polymer is in the range of 2000-500 000 g/mol, preferably 3000-200 000 g/mol, more preferably 3000-100 000 g/mol, even more preferably 3000-47 000 g/mol, sometimes even more preferably 4000-30 000 g/mol. It has been observed that the first host polymer is more effective in interacting with disturbing substances when its molecular weight is low. The low molecular weight may also improve the solubility of the polymer composition. Furthermore, the polymerisation of the second polymer is easier when the molecular weight of the first host polymer is low as the viscosity of the first host polymer is lower. For example, it may be possible to achieve a higher molecular weight for the second polymer when the molecular weight of the first host polymer, and consequently the viscosity of the polymerisation medium, is low. The weight average molecular weight is determined by using size-exclusion chromatography (SEC), such as gel permeation chromatography using procedures known as such for a person skilled in art.

The first host polymer may be prepared by free-radical solution polymerisation in a polymerisation reactor. The monomers of the first host polymer may be added to the polymerisation reactor before initiator(s). After the polymerisation reaction is completed the first host polymer is preferably free of radical polymerisable groups, such as double carbon-carbon bonds, in its structure. In a preferable embodiment the monomers of the second polymer, when polymerised in the presence of the first host polymer, are reacting with each other and not forming covalent bonds with the first host polymer.

The second polymer is polymerised in presence of the first host polymer. This is assumed to provide an optimal extension or reach for the chains of the second polymer which, together with the physical entanglement between the first host polymer and the second polymer, provides a three-dimensional structure that improves the floc formation. Furthermore, the extended chains of the second polymer are assumed to provide structure for the polymer composition and improve its performance under compression. This improves the flocculation efficiency of polymer composition and the performance of the flocs in different applications, even in difficult environments with high conductivity. The second polymer may be prepared by adiabatic free-radical polymerisation.

Conventionally structured polymers are prepared by addition of branching agents to the monomers being polymerised, or by conducting post-polymerisation crosslinking of polymer chains. According to the present invention it is possible to obtain a structured polymer composition without using branching or cross-linking agents. This is advantageous as the branching and cross-linking agents are typically toxic. Furthermore, each additional component adds complexity to the manufacturing process, and good polymer solubility may be difficult to achieve when using branching agents. According to one embodiment the polymer composition is free from branching agents and/or crosslinking agents.

The polymer composition may comprise at most 20 weight-%, preferably at most 15 weight-%, more preferably at most 12.5 weight-%, even more preferably at most 10 weight-%, of the first host polymer, calculated from the total polymeric material of the composition, as dry. According to one embodiment the amount of the first host polymer in the polymer composition may be in the range of 1-20 weight-%, preferably 2-20 weight-%, more preferably 2-15 weight-%, even more preferably 2-10 weight-% or 2-8 weight-%, calculated from the total polymeric material of the composition, as dry. Preferably the amount of first host polymer is relatively low, so that the amount of the second polymer in the obtained final polymer composition, and thus the molecular weight of the obtained final polymer composition, may be higher. This may provide the best performance in sludge dewatering and drainage in paper manufacture.

According to one embodiment the second polymer is polymerised in presence of a first host polymer and at least one further second host polymer, which are different from each other. Thus the second polymer may be polymerised in a mixture of first and second host polymers. All information given above and relating to the first host polymer is applicable to the second host polymer, if such is present in the polymerisation medium.

The polymer composition may comprise >80 weight-%, preferably >85 weight-%, preferably >90 weight-%, of the second polymer, calculated from the total polymeric material of the composition, as dry. According to one embodiment the amount of the second polymer in the polymer composition may be in the range of 80-99 weight-%, preferably 80-98 weight-%, more preferably 85-98 weight-%, even more preferably 90-98 weight-% or 92-98 weight-%, calculated from the total polymeric material of the composition, as dry.

According to one embodiment of the invention the obtained polymer composition has a charge density of at the most 5.0 meq/g, preferably at the most 4.0 meq/g, more preferably at the most 3.0 meq/g, even more preferably at the most 2.0 meq/g. According to one embodiment of the invention the charge density of the polymer composition is in the range of 0.1-5.0 meq/g, preferably 0.1-4.0 meq/g, more preferably 0.1-3.0 meq/g, even more preferably 0.7-2.0 meq/g. The charge density values can be measured by using Mütek at pH 7.0. When the polymer composition has charge density <5.0 meq/g, preferably <4.0 meq/g, the risk for over-cationisation is reduced in paper or board making process. This makes the dosing of the polymer composition easier and reduces process disturbances.

According to one preferable embodiment of the present invention the second polymer has cationicity in the range of 1-15 mol-%, preferably 5-10 mol-%. The second polymer may be prepared by copolymerisation of acrylamide and ADAM-Cl in presence of a first host polymer. The first host polymer may be a copolymer of acrylamide and at least one cationic first monomer, preferably DADMAC. Cationicity of the first host polymer is preferably in the range of 5-60 mol-%, more preferably 5-40 mol-%, even more preferably 10-30 mol-%, and preferably the weight average molecular weight is in the range of 2000-500 000 g/mol, preferably 4000-30 000 g/mol. The amount of the first host polymer in the polymer composition may be 2-20 weight-%, preferably 2-8 weight-% or 3-9 weight-%. This polymer composition is especially suitable for use in paper or board making as a drainage agent.

It has been observed that elevated conductivity and/or elevated cationic demand of the environment, e.g. fibre stock or sludge, may exert a compressing force on the cationically charged polymer chains. It is currently assumed that when the cationic charge of the present polymer composition, and especially the cationicity of the second polymer, is modest, the polymer chains in general may be less compressed, and remain more extended. This may enable an efficient flocculation which is obtainable through the interactions of the second polymer of the polymer composition. In this manner the flocculation ability of the polymer composition, including extension of the polymer chains and the polymers' capacity to form ionic bonds and take part of electrostatic interactions, is not exhausted by elevated cationic demand and/or conductivity, but it is preserved for the suspended solids. This may provide for the formation of strong flocs. Also further enhanced floc size, density and/or stability may be obtained.

The polymer composition may have a standard viscosity of >3 mPas, preferably >3.7 mPas, more preferably >4.5 mPas, when dissolved and measured at 0.1 weight-% solids content in an aqueous NaCl solution (1 M), at 25° C., using Brookfield DVII T viscometer with UL adapter. Preferably the standard viscosity of the polymer composition is <7 mPas, to provide easier processing of the polymer composition.

According to one embodiment the polymer composition is not in form of a water-in-oil or oil-in water emulsion. Preferably the polymer composition is free of any oil phase and/or organic solvent phase. This reduces the need for certain auxiliaries, such as emulsifiers, which improves the suitability of the polymer composition for number of processes where use of emulsifiers is problematic or restricted. Furthermore, absence of oil and/or organic solvent phase also reduces or eliminates the problems relating volatile organic compounds, which improves the occupational safety of the workers coming into contact with the polymer composition.

The polymer composition may preferably be in form of a dry particulate product or powder. The obtained polymer composition may be dried and optionally milled to a suitable particle size. According to one embodiment the dry polymer composition in form of particulate product or powder may have a solids content of at least 80 weight-%, preferably at least 85 weight-%, more preferably at least 90 weight-%. Dry particulate polymer composition is easy and cost-efficient to transport and store, it remains stable for long periods and is resistant towards microbiological degradation.

According to one embodiment the polymer composition may be obtained by gel polymerisation, where the monomers of the second polymer are polymerised in the presence of the first polymer. After the gel polymerisation, the obtained polymer composition in gel form is comminuted, such as ground, shredded or chopped, as well as dried. After drying, the comminuted polymer composition may be milled to a desired particle size and packed for storage and/or transport, whereby a dry particulate polymer composition product is obtained. Depending on the used reaction apparatus, shredding or chopping may be performed in the same reaction apparatus where the polymerisation takes place. For example, polymerisation may be performed in a first zone of a screw mixer, and the shredding of the obtained polymer is performed in a second zone of the said screw mixer. It is also possible that the shredding, chopping or other particle size adjustment is performed in a treatment apparatus, which is separate from the reaction apparatus. For example, the obtained polymer composition may be transferred from the second end of a reaction apparatus, which is a belt conveyor, through a rotating hole screen or the like, where it is shredded or chopped into small particles.

According to one embodiment of the invention, the polymer composition is in form of a dry particulate product or powder and has at least one, preferably several, of the following characteristics: the charge density of the polymer composition is at most 5 meq/g; the cationicity of the second polymer is at most 20 mol-%; the amount of first host polymer in the composition is <15 weight-%; the weight average molecular weight of the first host polymer is <100 000 g/mol; and the cationic monomer in the first host polymer and the second polymer is different.

The polymer composition according to the invention may preferably be used as a drainage agent or as a retention agent in paper or board manufacture. Retention is here understood as retention of at least fines, fillers and colloidal particles, which may be present in the stock, to the web. The polymer composition is preferably added to thin stock. The polymer composition may be added before or after the last shear stage, preferably after the last shear stage. More preferably the polymer composition is added to the fibre stock after the last shear stage so close to headbox as possible. Examples of shear stages in the manufacture of paper or board are pumps and various screens, such as centriscreens. According to one embodiment of the invention the fibre stock is allowed to pass a number of shear stages and the drainage agent comprising the polymer composition is added to the fibre stock 3-60 s, preferably 4-15 s, before forming of the fibre web. In this manner the optimal drainage efficiency may be obtained by using the lowest possible dosage of the polymer composition. The dosage of the polymer composition, when used as a drainage agent, may be 0.05-1.0 kg/ton dry paper, preferably 0.1-0.5 kg/ton dry paper.

The polymer composition may be used with one or more additional drainage agents, such as bentonite, silica, polyaluminium chloride, alum, organic micropolymers, starches, polyamines, polyvinylamine, polyethylenimine, poly-DADMAC, anionic polyacrylamide, cationic polyacrylamide, amphoteric polyacrylamide or glyoxylated polyacrylamide.

The polymer composition is dissolved and diluted with water into suitable working concentration before the polymer composition is added to the fibre stock.

The polymer composition is suitable for use in paper or board manufacture where recycled fibre material is used as raw material for fibre stock. The fibre material in the fibre stock may comprise up to 100% of recycled fibres. According to one embodiment the fibre stock may comprise at least 20 weight-%, preferably at least 30 weight-%, more preferably at least 40 weight-%, of fibres originating from recycled fibre material.

The polymer composition is especially suitable for fibre stocks having conductivity >1.5 mS/cm, preferably >2.0 mS/cm, more preferably >3.0 mS/cm. The conductivity of the fibre stock may be, for example, in the range of 1.5-10 mS/cm, preferably 2.0-8 mS/cm, more preferably 3-6 mS/cm, measured at the headbox of the paper machine.

According to one embodiment the present polymer composition is suitable for use in paper or board manufacture, where it is added to an aqueous fibre containing medium, where the liquid phase of the aqueous medium has a cationic demand >300 µeq/l, sometimes even >500 µeq/l, measured by Mütek titration after filtration of the aqueous medium through black ribbon filter paper. The aqueous medium may be fibre stock for making of paper or board or sludge originating from the manufacturing process of pulp, paper or board. Due to its polymer network structure the polymer composition may be capable of capturing non-ionic soluble and colloidal material. Furthermore, it is believed that the first host polymer captures the anionic trash present in the aqueous medium which would otherwise disturb the flocculation and the function of the second polymer and optional other cationic chemicals added to the medium. The first host polymer is able to bind the trash permanently to the fibres, which reduces the amount of anionic trash in the circulating waters and decreases the load of suspended solids.

In general, conventional separate use of a fixative agent and a flocculant agent, i.e. addition of separate agents, may result in capture of anionic trash by the fixative agent. Usually fixative agents have low molecular weight, which may lead to poor fixation of the anionic trash to the fibres. The formed complexes comprising fixative agent and anionic trash are not necessarily trapped by the fibre flocs created by the flocculant agents, which means that there can be significant accumulation of the complexes to the process water. Contrary to these conventional systems using separate chemical agents, the polymer composition according to the present invention effectively attaches anionic trash to fibres of fibre flocs.

The polymer composition according to the invention is also suitable for sludge dewatering in municipal or industrial processes. The polymer composition is especially suitable for dewatering sludge that originates from manufacturing process of pulp, paper or board, for example deinking pulp sludge dewatering. A sludge originating from manufacturing process of pulp, paper or board comprises an aqueous liquid phase and fibre material suspended in the aqueous phase. The fibre material is cellulosic fibre material originating from wood or non-wood sources, preferably from wood sources. The fibre material is here understood as the long fibre fraction, which is retained on 100 mesh filter. In this context long fibre is synonymous and interchangeable with usable fibre. The sludge may comprise this fibre material in amount of 2-50 weight-%, preferably 5-30 weight-%, more preferably 7-20 weight-%. Further, the sludge may comprise inorganic mineral particles and have ash content in the range of 20-90%, preferably 20-85%. Ash content is determined by using Standard ISO 1762, temperature 525° C. The inorganic mineral particles in the sludge originate from fillers and coating materials used in paper and board making. It has been observed that the polymer composition provides improved dewatering, higher solids content after pressing, reduced polymer consumption and good filtrate quality. The polymer composition is also effective in environments having a high pH value and/or high conductivity.

In sludge dewatering the dosage of the polymer composition may be <20 kg, preferably <5 kg, more preferably <3 kg, given per ton dry sludge. In general the dosage of the polymer composition is given in this application as dry, active composition, if not otherwise stated. According to one embodiment of the invention the dosage of the polymer composition may be in the range of 0.4-20 kg, preferably 0.4-5 g, more preferably 0.4-3 kg, given per ton dry sludge. For dewatering applications of deinking sludge the dosage of the polymer composition is between 0.4-4 kg, preferably 0.5-3 kg, given per ton dry sludge. It has been observed that effective dewatering results are achieved with small dosage, in comparison to conventional polymers having similar standard viscosities and charge densities.

The polymer composition may be used for deinking sludge dewatering in a thickening stage. Preferably the polymer composition is added to the deinking sludge before pre-thickening and pressing of the sludge. Deinking sludge may contain fibre material comprising both short and long fibre fractions, inorganic mineral material from coating and/or fillers, as well as ink particles. The deinking sludge may comprise 7-20 weight-% of long fibre material, calculated from the dry weight of the sludge. Deinking sludge may have an Effective Residual Ink Concentration (ERIC), measured at 950 nm, which is >500, preferably >1000. Suitable instrument available for ERIC measurements are commercially available, e.g. from Technidyne, Inc., USA. The ash content of the deinking sludge is preferably 40-80%, more preferably 50-65%, determined by using Standard ISO 1762, temperature 525° C. According to one embodiment of the invention the aqueous sludge is deinking sludge from repulping process of newsprint and/or magazine paper. According to one embodiment of the invention the sludge is deinking sludge from repulping process of office paper, such as mixed office waste or sorted office waste. As the polymer composition provides an improved floc size and a good floc stability, the flocs may not take up too much water, the water may be released more easily from the flocs and the flocs are not broken under pressure. Thus it is possible to obtain faster dewatering rate both at free drainage, i.e. faster pre-thickening, and at pressing stage, and higher dry solids at the pressing stage.

The polymer composition may be added to the sludge prior or at the thickening stage, which comprises a pre-thickening step and a pressing step. The polymer composition is added to the sludge before the pre-thickening step, where a first part of the aqueous phase is removed from the sludge. Pre-thickening may be performed e.g. by using a thickening drum, gravity table or gravity belt, i.e. at free drainage without applied pressure. Pre-thickening step may take 5-30 s, typically 10-20 s. The sludge may have a solids content in the range of 1-5%, preferably 1.5-4%, before the pre-thickening step and before the addition of the polymer composition.

The thickening stage thus comprises a mechanical pre-thickening step, where the solids content of the sludge is increased by separation of water. Pre-thickening may be performed without active suction, or preferably the mechanical pre-thickening may be performed at free drainage without applied pressure. The solids content of the sludge may be 5-14 weight-%, preferably 7-13 weight-%, after the mechanical pre-thickening step.

According to one embodiment of the invention the polymer composition is added to the sludge 1 s-10 min, preferably 1-20 s, before the pre-thickening step. The polymer composition flocculates the solid material present in the sludge, such as fibres and inorganic particles, providing an optimal floc size for dewatering and a good floc stability in two-stage thickening comprising a pre-thickening and pressing step. Thus the flocs do not take up too much water, the water is released more easily from the flocs and the flocs are not broken under pressure or between different process stages. Furthermore, it is possible to obtain faster dewatering rate both at free drainage in the pre-thickening step as well as under pressure in the pressing step.

After the pre-thickening step the sludge is subjected to a pressing step where a further second part of the aqueous phase is removed from the sludge under a pressure or force and dry pressed sludge is obtained. Pressing step may take 1-20 min, typically 2-20 min. The pressing step may be performed by using, for example, a screw press, belt filter or the like, preferably a screw press. According to one preferable embodiment the dry pressed sludge exiting the pressing step has a solids content of at least 30 weight-%, preferably at least 45 weight-%, more preferably at least 50 weight-%, sometimes even at least 60 weight-%. For example, after the pressing step the sludge may have a solids content in the range of 30-75 weight-%, preferably 48-65 weight-%. The high solids content of the sludge makes it suitable for incineration or further processing for landfills or the like. The sludge may exit the pressing step as non-continuous sheet or in form of irregular lumps.

EXPERIMENTAL

Some embodiments of the invention are described in the following non-limiting examples.

General Procedure for Measurement of the Amount of Insolubles in a Polymer Composition Amount of insolubles in a polymer composition was measured as follows.

A 1000 ml beaker was filled to 900 ml with tap water having temperature of 25° C. and stirred at maximum vortex ca. 450 rpm. 1 g±0.001 g of dry polymer sample was weighed on an analytical balance and sprinkled into side of the water vortex. Stirring was continued for 60 minutes at same speed. The contents of the beaker were filtered through a stainless steel sieve with apertures of 300 microns. The beaker was washed thoroughly with tap water (25° C.), pouring the washings through the sieve. The sieve was washed under running tap water (25° C.) until the effluent was free from polymer (5-10 mins) and then allowed to drain. The amount of insolubles were detected by visual inspection and expressed as number of visible insoluble lumps (pieces) on the sieve.

General Procedure for Measurement of the Standard Viscosity of a Polymer Composition Standard viscosity of a polymer composition was measured as follows.

200.0 g (±0.1 g) of deionised water, conductivity <10 mS/cm, is weighed into a 600 ml tall form beaker. Water is stirred with a magnetic stirrer at maximum vortex. 0.33 g (±0.001 g) polymer is tapped slowly into the vortex over a period of 15 seconds. The used weigh boat is flicked with a finger to knock off any remaining polymer particles into the solution. Stirring is continued at maximum vortex for a maximum of 5 minutes, until the polymer is dispersed. After that stirring is continued for a further 25 minutes on a setting of 350 rpm.

117.5 g (±0.1 g) of NaCl solution, which is prepared by dissolving 700 g NaCl to 4000 g water, is added to the beaker and stirring is continued for an additional 5.0 min (±15 sec). This time limit should not be exceeded.

The solution is filtered through 250 micron stainless steel mesh sieve having diameter of 10 cm. A 16 ml aliquot of filtered solution is measured on a Brookfield viscometer using an UL adapter at 25° C. at the specified speed. Three readings are taken on the first aliquot, the first reading is ignored, and providing that the following two readings are within 0.05 cp, the average of the two readings is calculated. If the following two readings are greater than 0.05 cp apart, then the sample is disregarded and the process is repeated by using a second aliquot. Results are reported with 2 decimals.

Example of Preparation of the Polymer Compositions Used in the Experiments

Inventive Compositions

The first host polymer (HP1) was a copolymer of acrylamide and DADMAC, polymerised by using 80-90 mol-% of acrylamide monomers and 10-20 mol-% of DADMAC monomers. This means that the amount of DADMAC was 20-36 weight-%, calculated from the total weight of the monomers used for polymerisation of the first host polymer. The first host polymer had a weight average molecular weight of 10 000 Da, measured by GPC SEC with PEO as standard polymer, and a cationic charge of 1.2-2.2 meq/g.

The second polymer was copolymer of acrylamide and [2-(acryloyloxy)ethyl] trimethylammonium chloride (ADAM-Cl). Before the polymerisation of the second polymer the used monomers, chain transfer agent, first host polymer and pH buffer in water were degassed with nitrogen at room temperature. Acrylamide monomers were added in amount of 90-98.5 mol-% and ADAM-Cl monomers were added in amount of 1.5-10 mol-%, as presented in Table 1 to a solution of the first host polymer. The difference in cationicity of the first host polymer and the second polymer are presented in Table 1, the first host polymer having a higher cationicity than the second polymer. The obtained reaction solution was cooled down at −3° C., an initiator added and polymerisation reaction started. The polymerisation was done in a batch reactor and it was adiabatic. After 30-40 min the polymerisation reaction was finished. The obtained polymer gel was processed by comminuting and drying. A polymer composition in form of a fine powder was obtained.

The polymer compositions C1, C2, C3, C4m and C5m comprised 2-8 weight-% of the first host polymer and 92-98 weight-% of the second polymer.

TABLE 1

Tested polymer compositions according to the invention.

| Polymer | Amount ADAM—Cl [mol-%] | Cationicity Difference of 1st Host Polym. & 2nd Polym. [mol-%] | Polym. Comp. charge [meq/g] | Standard Viscosity, Polym. Comp. [mPas] | Insolubles, Polym. Comp. [pcs] |
|---|---|---|---|---|---|
| C1 | 10 | 3-6 | 1.28 | 5.3 | 0 |
| C2 | 5 | 7-10 | 0.71 | 4.8 | 0 |
| C3 | 1.5 | 11-19 | 0.29 | 4.3 | 0 |
| C4m | 10 | 3-6 | 1.25 | 5.6 | 0 |
| C5m | 10 | 3-6 | 1.26 | 4.9 | 0 |

Reference Compositions R1, R2, R3, R7m:

Reference compositions R1, R2, R3 and R7m were copolymers of acrylamide and [2-(acryloyloxy)ethyl] trimethylammonium chloride (ADAM-Cl). The charge density and standard viscosity of these reference compositions are given in Table 2.

TABLE 2

Used monomer amounts and polymer properties for reference compositions R1, R2, R3 and R7m.

| Polymer | Charge [meq/g] | Standard Viscosity [mPas] |
|---|---|---|
| R1 (reference) | 1.2 | 5.1 |
| R2 (reference) | 0.6 | 4.9 |
| R3 (reference) | 0.2 | 4.0 |
| R7m (reference) | 1.2 | 3.4 |

Reference Composition R4 and R4m:

Reference composition R4 and R4m were prepared by mixing 2-8 weight-% of a copolymer of acrylamide and DADMAC together with 92-98 weight-% of a copolymer of acrylamide and ADAM-Cl. This means that the reference compositions R4 and R4m were blends of two different acrylamide copolymers. The properties of the copolymer of acrylamide and DADMAC correspond to the properties of the first host polymer given above. The cationicity difference between the copolymer of acrylamide and DADMAC and the copolymer of acrylamide and ADAM-Cl was 11-19 mol-% for reference composition R4, and 3-6 mol-% for reference composition R4m. The copolymer of acrylamide and DADMAC had a higher cationicity than the copolymer of acrylamide and ADAM-Cl. The charge density, as measured by Mütek charge titration, was 0.27 meq/g for the reference composition R4 and 1.24 meq/g for the reference composition R4m. It is intended that the individual components of the reference composition R4 corresponds to the first host polymer and second polymer of polymer composition C3, but reference composition R4 is prepared as a blend by mixing of two individual polymers. In the same manner individual components of the reference composition R4m corresponds to the first host polymer and second polymer of polymer compositions C4m and C5m, but reference composition R4m is prepared as a blend by mixing of two individual polymers.

Reference Composition R5m:

Reference composition R5m was prepared by polymerising 92-98 weight-% of a copolymer of acrylamide and ADAM-Cl in the presence of 2-8 weight-% of polyamine, which was a copolymer of epichlorohydrin and dimethylamine and had weight average molecular weight of 2000 g/mol, measured with GPC SEC, using PEO as standard polymer. 90 mol-% of acrylamide monomers and 10 mol-% of ADAM-Cl monomers were added to a solution of the copolymer of epichlorohydrin and dimethylamine and polymerised. The charge density of reference composition R5m, as measured by Mütek charge titration, was 0.3 meq/g, and standard viscosity 4.7 mPas. The reference composition R5m is similar to polymer compositions C1, C4m and C5m, but reference composition R5m is prepared by using different polymer as the first host polymer.

DRAINAGE EXAMPLES

Drainage Example 1

Pulp Preparation

Central European testliner board was used as raw-material. This testliner board comprised about 17% of ash and 5 weight-% (calculated to dry pulp) of surface size starch, which was enzymatically degraded native corn starch. Testliner board was cut to 2×2 cm squares. Dilution water was made from tap water by adjusting $Ca^{2+}$ concentration to 520 mg/l by $CaCl_2$) and by adjusting conductivity to 4 mS/cm by NaCl. 2.7 l of dilution water was heated to 85° C. The pieces of testliner board were wetted for 5 minutes in the heated dilution water at 2% concentration before disintegration of the pieces into a stock slurry. For disintegration a Britt jar disintegrator was used, with 30 000 rotations. After disintegration stock slurry was diluted to 0.69% by addition of dilution water.

Dynamic Drainage Analyzer (DDA) Test

A Dynamic Drainage Analyzer, DDA, (AB Akribi Kemikonsulter, Sweden) was used to measure drainage. DDA's vacuum and stirrer were calibrated and necessary adjustments to the settings were made. DDA was connected to a computer for measuring the time between vacuum application and the vacuum break point. A change of the vacuum expresses the forming time of a wet fibre web until air breaks through the thickening web indicating the drainage time. A drainage time limit was set to 30 seconds for the measurements.

In drainage measurements, 500 ml of the stock sample was measured into the reaction jar. The drainage test was performed by mixing the sample stock with the stirrer at 1200 rpm for 40 seconds while the chemicals to be tested were added in predetermined order. Test chemical addition times are indicated in result tables as negative time before the start of the drainage. Drainage test was using a wire with 0.25 mm openings. 300 mbar vacuum for 30 s after drainage was used. Drainage time was recorded. Filtrate turbidity was measured immediately. Wet sheet was weighted to calculate dry content after forming. Wet pressing of the sheets was completed individually immediately after drainage tests in Lorenz & Wettre wet press for 1 min at 4 bar pressure, 2 blotting papers both sides of the sheet. Pressed sheet was weighted and weighted again after 5 min drying in Lorenz & Wettre hot plate dryer to calculate dry content after pressing.

Results of Drainage Example 1

Drainage results of Example 1 are presented in Table 3.

TABLE 3

Drainage results of Drainage Example 1.

| # | Polymer | Dosage, at −10 s [kg/t] | Drainage time [s] | Filtrate turbidity, NTU |
|---|---------|------------------------|-------------------|-------------------------|
| 1 | 0-test | 0 | 6.9 | 482 |
| 2 | R1 | 0.2 | 6.0 | 158 |
| 3 | R1 | 0.4 | 5.5 | 97 |
| 4 | R1 | 0.6 | 5.9 | 77 |
| 14 | R7m | 0.2 | 6.1 | 197 |
| 15 | R7m | 0.4 | 6.4 | 119 |
| 16 | R7m | 0.6 | 6.3 | 95 |
| 5 | R5m | 0.2 | 5.8 | 179 |
| 6 | R5m | 0.4 | 5.6 | 98 |
| 7 | R5m | 0.6 | 6.0 | 80 |
| 8 | C4m | 0.2 | 5.5 | 152 |
| 9 | C4m | 0.4 | 5.2 | 93 |
| 10 | C4m | 0.6 | 5.5 | 67 |
| 11 | C5m | 0.2 | 5.6 | 157 |
| 12 | C5m | 0.4 | 5.4 | 95 |
| 13 | C5m | 0.6 | 5.4 | 77 |

Table 3 shows that a faster drainage time was achieved with the inventive polymer compositions C4m and C5m when compared to reference polymers R1, R5m, R7m. An improvement in drainage performance can be observed already with a low dosage of polymer C4m or C5m, which helps to reduce the amount of polymer needed in paper and board production. Especially, it can be observed that compositions C4m and C5m according to the present invention, where the first host polymer is a copolymer of acrylamide and DADMAC, have faster drainage in comparison to reference composition R5m, where the first host polymer is polyamine. Low filtrate turbidity, which indicates good retention of fines and fillers, as well as good retention of colloidal particles, have been achieved with the inventive compositions, especially with composition C4m, having a high standard viscosity value.

Table 4 shows that dry content of the sheet was improved after forming and after pressing. Low dosage of the polymer was beneficial for the dry content of the sheet after pressing.

TABLE 4

Dry content results.

| # | Polymer | Dosage at −10 s [kg/t] | Dry content after forming [%] | Dry content after pressing [%] |
|---|---------|-----------------------|-------------------------------|--------------------------------|
| 1 | R1 | 0.4 | 24 | 49 |
| 2 | C4m | 0.2 | 25 | 51 |
| 3 | C4m | 0.4 | 25 | 50 |
| 4 | C5m | 0.4 | 25 | 50 |

Drainage Example 2

Same test pulp, polymers and test methods were used in Drainage Example 2 than in Drainage Example 1.

In Drainage Example 2 the test pulp was diluted to 0.50% consistency with the same conductivity adjusted dilution water that was used in Example 1. Retention was calculated as the weight of the dried DDA sheet to the dry weight of the pulp fed to the DDA.

Results of Drainage Example 2

Drainage results of Drainage Example 2 are presented in Table 5. Table 5 shows improvement in drainage and filtrate turbidity with the inventive polymer compositions C4m and C5m when compared to reference polymers.

Microparticles (MP) such as bentonite, silica or cross-linked polymer particles can be used as a part of the retention and drainage system to improve drainage or retention further. Bentonite addition was tested to demonstrate the effect of microparticles together with inventive polymer compositions. Bentonite makes drainage faster and reduces turbidity further. It is seen that the polymer composition according to the invention provides improvements also when it is used together with microparticles.

TABLE 5

Drainage results of Drainage Example 2.

| # | Polymer | Polymer dosage at −15 s [kg/t] | Bentonite dosage at −10s [kg/t] | Drainage time [s] | Filtrate turbidity NTU |
|---|---------|-------------------------------|--------------------------------|-------------------|------------------------|
| 1 | 0-test | 0 | — | 6.2 | 409 |
| 2 | C4m | 0.15 | — | 5.2 | 171 |
| 3 | C4m | 0.3 | — | 5.3 | 106 |
| 15 | C4m | 0.15 | 2 | 4.3 | 135 |
| 16 | C4m | 0.3 | 2 | 3.9 | 81 |
| 8 | C5m | 0.15 | — | 5.3 | 200 |
| 9 | C5m | 0.3 | — | 5.2 | 134 |
| 4 | R4m | 0.15 | — | 5.3 | 197 |
| 5 | R4m | 0.3 | — | 5.4 | 119 |
| 6 | R1 | 0.15 | — | 5.3 | 192 |
| 7 | R1 | 0.3 | — | 5.4 | 120 |
| 13 | R1 | 0.15 | 2 | 4.4 | 147 |
| 14 | R1 | 0.3 | 2 | 4.1 | 96 |
| 10 | R7m | 0.15 | — | 5.5 | 229 |
| 11 | R7m | 0.3 | — | 5.6 | 154 |
| 12 | — | — | 2 | 5.5 | 257 |

Table 6 shows retention and dry content of the sheet after forming and after pressing when different polymers were used. It is seen that retention, dry content after forming and dry content after pressing were improved when a polymer composition according to the invention was used, compared to a blend of polymers as described above. The improvement was achieved already at relatively low dosage level of 0.15 kg/t of dry pulp.

TABLE 6

Retention and dry content of the sheet after forming and pressing

| # | Polymer | Polymer dosage at −15 s [kg/t] | Dry content after forming [%] | Dry content after pressing [%] | Retention [%] |
|---|---------|-------------------------------|-------------------------------|--------------------------------|---------------|
| 1 | 0-test | 0 | N/A | N/A | 86 |
| 2 | C4m | 0.15 | 26 | 52 | 88 |
| 3 | R4m | 0.15 | 26 | 51 | 88 |
| 4 | R1 | 0.15 | 25 | 50 | 86 |
| 5 | C5m | 0.15 | 27 | 52 | 90 |

SLUDGE DEWATERING EXAMPLES

The apparatuses and methods used in sludge dewatering examples are given in Table 7.

TABLE 7

Characterization of apparatuses and methods used in sludge dewatering examples.

| Property | Apparatus/Standard |
| --- | --- |
| pH | Knick Portamess 911 pH |
| Charge density | Mütek |
| Conductivity | Knick Portamess 911 Cond |
| Dry solids | SFS 3008 |
| Suspended solids | SFS 3008 |
| Ash (525° C.) | ISO 1762 |
| Turbidity | HACH 2100AN IS Turbidimeter//ISO 7027 |

Usable fibre content was determined by measuring 100 g of sludge to a 150 μm wire, where the distance between the wire threads is 150 μm, i.e. 100 mesh screen. The sludge was washed with running water until all other material except the fibres was washed off. After this the fibres were collected from the wire and dried in oven at 105° C. overnight. The dry fibres were weighed. Usable fibre content (150 μm wire) was calculated by using equation (1):

$$\text{Usable fibers (150 μm wire)} = \frac{\text{mass of dry fiber}}{\text{sludge dry solids} * \text{mass of sludge sample}} \qquad (1)$$

Gravity dewaterability of sludge was tested with Polytest. The sludge samples were filtered with Polytest cylinder of 10 cm diameter using in bottom a wire cloth having air permeability of 5400 m³/m²h. Treads/cm was 13.0/5.9. The sludge sample amount was 200-400 g, but always identical between samples compared. Mixing of the polymer composition was done with motor stirrer in baffled mixing vessel. Mixing speed was 600 rpm and mixing time was 10 seconds.

Sludge Dewatering Example 1

This example simulates dewatering process of combined waste sludges from pulp or paper mill. Measured sludge properties are presented in Table 8.

TABLE 8

Properties of combined waste sludge in Sludge Dewatering Example 1.

| Property | Value |
| --- | --- |
| pH | 6.57 |
| Charge density | −363 μeq/l |
| Conductivity | 3.41 mS/cm |
| Dry solids | 4.11% |
| Suspended solids | 3.53% |
| Usable fibres (150 μm wire) | 9.25% |
| Ash (525° C.) | 63.7% |

Polymer compositions were diluted to 0.1% concentration before dosing to the sludge. Dewatering rate was tested with Polytest as described above. Polymer doses were 0.84 kg/ton dry sludge. Sludge sample was 400 g. Amount of drained water was measured after 10, 25 and 55 seconds. Suspended solids content was measured from the drained reject water. Results from these experiments are presented in Table 9.

TABLE 9

Results for drainage and reject water suspended solids.

| Polymer | Drainage 10 s [g] | Drainage 25 s [g] | Drainage 55 s [g] | Reject water SS [mg/l] |
| --- | --- | --- | --- | --- |
| R1 | 144.1 | 192.3 | 281.0 | 567 |
| C1 | 160.6 | 212.4 | 295.0 | 515 |

Polymer composition C1 according to the invention had better performance than the reference composition R1. Polymer composition C1 had a faster dewatering and better reject water quality than the reference composition R1. All of these factors are important for economical sludge dewatering.

Sludge Dewatering Example 2

This example simulates dewatering process of newsprint deinking pulp (DIP) sludge. DIP sludge refers to sludge that is generated in processing and repulping recycled paper or board. Measured sludge properties are presented in Table 10.

TABLE 10

Properties of DIP sludge in Sludge Dewatering Example 2.

| Property | Value |
| --- | --- |
| pH | 7.53 |
| Charge density | −270 μeq/l |
| Conductivity | 3.69 mS/cm |
| Dry solids | 2.52% |
| Usable fibres (150 μm wire) | 9.47% |
| Ash (525° C.) | 65.63% |

Polymer compositions were diluted to 0.1% concentration before dosing to the sludge. Dewatering rate was tested with Polytest as described above. Polymer doses were 0.9 kg/ton dry sludge. Sludge samples were 400 g. Amount of drained water was measured after 10 and 25 seconds. Suspended solids content was measured from the drained reject water. Results from these experiments are presented in Table 11.

TABLE 11

Results for drainage and reject water suspended solids.

| Polymer | Drainage 10 s [g] | Drainage 25 s [g] | Reject water SS [mg/l] |
| --- | --- | --- | --- |
| R2 | 270.2 | 324.6 | 784.28 |
| C2 | 298.0 | 329.5 | 689.57 |

Polymer composition C2 according to the invention had better performance than the reference composition R2. Polymer composition C2 had faster dewatering and better reject water quality than the industrial reference composition R2. All of these factors are important for economical sludge dewatering.

Sludge Dewatering Example 3

This example simulates dewatering process of newsprint deinking pulp sludge. Measured sludge properties are presented in Table 12.

TABLE 12

Properties of DIP sludge in sludge dewatering example 3.

| Property | value |
|---|---|
| pH | 7.51 |
| Charge density | −1385 µeg/l |
| Conductivity | 3.20 mS/cm |
| Dry solids | 2.74% |
| Suspended solids | 2.23% |
| Usable fibres (150 µm wire) | 9.89% |
| Ash (525° C.) | 61.55% |

Polymer compositions were diluted to 0.1% concentration before dosing to the sludge. Dewatering rate was tested with Polytest as described above. Polymer doses were 0.75 kg/ton dry sludge and 1.0 kg/ton dry sludge. Size of sludge samples was 400 g. Amount of drained water was measured after 10 and 25 seconds. Suspended solids content was measured from the drained reject water. After Polytest the sludge sample was pressed with Afmitec Friesland B.V.™ mini-press for 60 seconds with 5 bar pressure. Dry solids content of the sludge sample was measured after the pressing. Results from these experiments are presented in Table 13.

TABLE 13

Drainage, reject water SS and DS after pressing results

| Polymer | Dose [kg/t DS] | Drainage 10 s [g] | Drainage 25 s [g] | Reject water SS [mg/l] | DS after pressing [%] |
|---|---|---|---|---|---|
| R3 | 0.75 | 221 | 298 | 1183 | 56.7 |
| C3 | 0.75 | 257 | 323 | 1174 | 58.0 |
| R3 | 1.0 | 259 | 324 | 952 | 56.6 |
| C3 | 1.0 | 275 | 330 | 749 | 57.8 |

Polymer composition C3 according to the invention had better performance than the reference composition R3. Polymer composition C3 had faster dewatering, better reject water quality and higher dry solids after pressing than the industrial reference composition R3. All of these factors are important for economical sludge dewatering.

Sludge Dewatering Example 4

This example simulates dewatering process of newsprint deinking pulp sludge. Measured sludge properties are presented in Table 14.

TABLE 14

Properties of DIP sludge in sludge dewatering example 4.

| Property | Value |
|---|---|
| pH | 7.4 |
| Charge density, µeq/l | −1562 |
| Conductivity, mS/cm | 3.22 |
| Dry solids, % | 2.58 |
| Suspended solids, % | 2.01 |
| Usable fibres (150 µm wire) | 12.82 |
| Ash (525° C.), % | 58.67 |

Polymer compositions were diluted to 0.1% concentration before dosing to the sludge. Dewatering rate was tested with Polytest as described above. Polymer doses were 0.75 kg/ton dry sludge and 1.0 kg/ton dry sludge. Size of sludge samples was 200 g. Amount of drained water was measured after 5 seconds. Turbidity and suspended solids content was measured from the drained reject water. Results from these experiments are presented in Table 15.

The results show the difference between polymer composition according to the present invention and blend of similar polymer components.

TABLE 15

Results for drainage, reject water suspended solids and turbidity.

| Polymer | Dose [kg/t DS] | Drainage 5 s [g] | Reject water turbidity, NTU | Reject water SS [mg/l] |
|---|---|---|---|---|
| R4 | 0.75 | 129 | 6094 | 2188 |
| C3 | 0.75 | 133 | 4475 | 1635 |
| R4 | 1.0 | 143 | 3247 | 1277 |
| C3 | 1.0 | 149 | 2337 | 1085 |

Polymer composition C3 according to the invention has better performance than the reference composition R4 comprising a blend of corresponding individual polymers. Polymer composition C3 had faster dewatering and better filtrate quality. Both of these factors are important for economical sludge dewatering. This demonstrates that a polymer composition according to the present invention is beneficial compared to a blend of corresponding individual polymers.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A polymer composition comprising:
   at most 10 weight-% of a first host polymer, calculated from a total polymeric material of the composition, as dry, which first host polymer is a copolymer of (meth)acrylamide and at least one cationic first monomer and has a weight average molecular weight <50,000 g/mol,
   a second polymer, which is a copolymer of (meth)acrylamide and at least one cationic second monomer, the second polymer being polymerized in presence of the first host polymer,
   wherein the first host polymer has a higher cationicity than the second polymer, the difference in cationicity of the first host polymer and the second polymer being at least 3 mol-%, and
   wherein the polymer composition has a charge density of at most 3 meq/q and a standard viscosity of >2.0 mPas, dissolved and measured at 0.1 weight-% solids content in an aqueous NaCl solution (1 M), at 25° C., using a Brookfield DVII T viscometer with a UL adapter.

2. The polymer composition according to claim 1, wherein the polymer composition is in form of a dry particulate product.

3. The polymer composition according to claim 2, wherein the polymer composition has a solids content of at least 80 weight-%.

4. The polymer composition according to claim 1, wherein the polymer composition has a charge density of at most 2.0 meq/g.

5. The polymer composition according to claim 1, wherein the first and/or second monomer is selected from 2-(dimethylamino)ethyl acrylate (ADAM), [2-(acryloyloxy)ethyl] trimethylammonium chloride (ADAM-Cl), 2-(dimethylamino)ethyl acrylate benzylchloride, 2-(dimethylamino)ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino)propyl] trimethylammonium chloride (APTAC), [3-(methacryloylamino)propyl] trimethylammonium chloride (MAPTAC), and diallyldimethylammonium chloride (DADMAC).

6. The polymer composition according to claim 1, wherein the cationic first monomer and the cationic second monomer are different from each other.

7. The polymer composition according to claim 1, wherein the second polymer has cationicity of at most 60 mol-%.

8. The polymer composition according to claim 1, wherein the first host polymer has cationicity of at most 80 mol-%.

9. The polymer composition according to claim 1, wherein the polymer composition has a standard viscosity of >3 mPas, measured at 0.1 weight-% solids content in an aqueous NaCl solution (1 M), at 25° C., using Brookfield DVII T viscometer with UL adapter.

10. A method for making paper or board, comprising:
obtaining a fibre stock,
adding a drainage agent to the fibre stock,
forming the fibre stock into a fibre web,
wherein the drainage agent comprises a polymer composition according to claim 1.

11. The method according to claim 10, further comprising allowing the fibre stock to pass a number of shearing stages and adding the drainage agent comprising the polymer composition to the fibre stock 3-60 seconds, before forming of the fibre web.

12. The method according to claim 10, wherein the dosage of the polymer composition is <20 kg/ton dry sludge.

13. The method according to claim 10, further comprising using the polymer composition as a draining agent in paper or board manufacture.

14. The method according to claim 10, further comprising using the polymer composition in a dosage of 0.05-1.0 kg/ton dry paper.

15. The polymer composition according to claim 1, wherein the difference in cationicity of the first host polymer and the second polymer is at least 5 mol-%.

16. The polymer composition according to claim 1, wherein the cationic first monomer is diallyldimethylammonium chloride and the cationic second monomer is [2-(acryloyloxy)ethyl] trimethylammonium chloride.

17. The polymer composition according to claim 1, wherein the second polymer has cationicity of at most 20 mol-%.

18. The polymer composition according to claim 1, wherein the first host polymer has cationicity of at most 40 mol-%.

* * * * *